US010505647B2

(12) United States Patent
Lee et al.

(10) Patent No.: US 10,505,647 B2
(45) Date of Patent: Dec. 10, 2019

(54) METHOD AND APPARATUS FOR CALIBRATION IN RADIO FREQUENCY MODULE

(71) Applicant: Samsung Electronics Co., Ltd., Suwon-si, Gyeonggi-do (KR)

(72) Inventors: Dae-Young Lee, Seongnam-si (KR); Chul-Woo Byeon, Suwon-si (KR); Ju-Ho Son, Seoul (KR); Jeong-Ho Lee, Suwon-si (KR); Mee-Ran Kim, Ansan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 456 days.

(21) Appl. No.: 15/206,720

(22) Filed: Jul. 11, 2016

(65) Prior Publication Data
US 2017/0012349 A1    Jan. 12, 2017

(30) Foreign Application Priority Data
Jul. 9, 2015 (KR) .................. 10-2015-0097571

(51) Int. Cl.
*H04B 1/44* (2006.01)
*H04B 17/12* (2015.01)
*H04B 17/21* (2015.01)

(52) U.S. Cl.
CPC .............. *H04B 17/21* (2015.01); *H04B 1/44* (2013.01); *H04B 17/12* (2015.01)

(58) Field of Classification Search
CPC .... H04B 1/0007; H04B 1/0028; H04B 1/005; H04B 1/38; H04B 1/40; H04B 1/44;
(Continued)

(56) References Cited
U.S. PATENT DOCUMENTS 6,148,219 A * 11/2000 Engelbrecht .......... H04W 64/00
                                                                    455/456.2
8,160,501 B1 * 4/2012 Hyde ................. H04B 7/15578
                                                                    455/67.11
(Continued)

FOREIGN PATENT DOCUMENTS

JP     2006-019991 A     1/2006
KR    10-2008-0061394 A    7/2008

OTHER PUBLICATIONS

Michael Boers et al., A 16TX/16RX 60 GHz 802.11ad Chipset with Single Coaxial Interface and Polarization Deiversity, IEEE Journal of Solid-State Circuits, pp. 3031-3045, Dec. 16, 2014.

*Primary Examiner* — Young T Tse
(74) *Attorney, Agent, or Firm* — Jefferson IP Law, LLP

(57) ABSTRACT

An apparatus and a method for phase calibration in a radio frequency (RF) module that constitutes a wireless communication device are provided. The apparatus and method include a test signal is emitted by a forward transmission antenna array of a first antenna array, and the emitted test signal, which is transferred by a member that covers the first and second antenna arrays, is received through a forward reception antenna array of the second antenna array. On the basis of the received test signal, a phase value is calibrated with regard to each of chain combinations formed by the first and second antenna arrays. Forward chain combinations that constitute the chain combination may be determined by a combination of forward transmission chains, which correspond to respective transmission antennas that constitute the forward transmission antenna array, and forward reception chains, which correspond to respective reception antennas that constitute the forward reception antenna array.

14 Claims, 10 Drawing Sheets

(58) Field of Classification Search
CPC . H04B 1/50; H04B 1/54; H04B 17/00; H04B 17/11; H04B 17/12; H04B 17/15; H04B 17/21; H04B 17/24
USPC ........... 375/219–222, 224, 257, 267; 455/39, 455/500, 63.1, 67.11, 67.13, 68, 69, 73, 455/78, 83, 88, 553.1
See application file for complete search history.

(56) References Cited

U.S. PATENT DOCUMENTS

| | | | |
|---|---|---|---|
| 8,358,577 B1* | 1/2013 | Khanka | H04L 41/0663 370/221 |
| 2005/0227628 A1 | 10/2005 | Inanoglu | |
| 2007/0225042 A1 | 9/2007 | Kitahara | |
| 2008/0285637 A1 | 11/2008 | Liu et al. | |
| 2009/0117859 A1* | 5/2009 | Smith | H04B 7/0413 455/78 |
| 2009/0233562 A1 | 9/2009 | Kim et al. | |
| 2009/0325481 A1* | 12/2009 | Mohebbi | H04B 7/1555 455/15 |
| 2010/0093282 A1 | 4/2010 | Martikkala et al. | |
| 2011/0038306 A1* | 2/2011 | Potkonjak | H04L 45/123 370/328 |
| 2013/0079060 A1 | 3/2013 | Pivit et al. | |
| 2013/0109324 A1* | 5/2013 | Garrett | H04B 7/0408 455/73 |
| 2013/0136447 A1* | 5/2013 | Cavaliere | H04J 14/0282 398/49 |
| 2013/0137381 A1 | 5/2013 | Vassiliou et al. | |
| 2015/0038101 A1* | 2/2015 | Maxim | H04B 1/04 455/340 |

* cited by examiner

METHOD AND APPARATUS FOR CALIBRATION IN RADIO FREQUENCY MODULE

CROSS-REFERENCE TO RELATED APPLICATION(S)

This application claims the benefit under 35 U.S.C. § 119(a) of a Korean patent application filed on Jul. 9, 2015 in the Korean Intellectual Property Office and assigned Serial number 10-2015-0097571, the entire disclosure of which is hereby incorporated by reference.

TECHNICAL FIELD

The present disclosure relates to an apparatus and a method for phase calibration in a radio frequency (RF) module that constitutes a wireless communication device.

BACKGROUND

There have been ongoing efforts to develop improved $5^{th}$-Generation (5G) communication systems or pre-5G communication systems, in order to satisfy wireless data traffic demands that have been on the rise since commercialization of $4^{th}$-Generation (4G) communication systems. For this reason, the 5G communication systems or the pre-5G communication systems are referred to as Beyond-4G-Network communication systems or post-long term evolution (LTE) systems.

In order to achieve a high data transmission rate, implementation of the 5G communication systems in a mmWave band (for example, 60 GHz band) is being considered. In order to mitigate the path loss of radio waves and to increase the propagation distance of radio waves in the mmWave in connection with the 5G communication systems, technologies such as beamforming, massive multi-input multi-output (massive MIMO), full dimensional MIMO (FD-MIMO), array antennas, analog beam-forming, and large-scale antennas are being discussed.

Furthermore, in order to improve the system network in connection with the 5G communication systems, technologies such as evolved small cells, advanced small cells, cloud radio access networks (cloud RAN), ultra-dense networks, device-to-device communication (D2D), wireless backhaul, moving networks, cooperative communication, coordinated multi-points (CoMP), and interference cancellation have been developed.

In connection with the 5G communication systems, besides, there have been developments of hybrid frequency shift keying (FSK) and quadrature amplitude modulation (QAM) modulation (FQAM) and sliding window superposition coding (SWSC), which are advanced coding modulation (ACM) schemes, and filter bank multi carrier (FBMC), non orthogonal multiple access (NOMA), and sparse code multiple access (SCMA), which are advanced access technologies.

A wireless communication device for 5G communication may support communication in the mmWave band on the basis of a multi-antenna (for example, MIMO) structure. To this end, the wireless communication device may include a radio frequency (RF) module that supports communication in the mmWave band on the basis of a multi-antenna (for example, MIMO) structure. The RF module is, in general, configured as an integrated circuit (IC). The IC is also referred to as a "chip".

The RF may not always be able to provide the performance, which has been set as the target during design, due to variations in the process, voltage, and temperature (PVT). This is because characteristics of elements (power amplifier (PA), low noise amplifier (LNA), mixer, LO, ABB, etc.) that constitute the RF module may be varied by environments, parameters, etc.

Therefore, the wireless communication device may perform calibration regarding the RF module, in order to maintain operations that exhibit stable performance. The calibration may be an operation of adjusting the tuning parameters of the elements (PA, LNA, mixer, LO, ABB, etc.) that constitute the RF module such that the RF module can operate and exhibit the performance that has been set as the target during design. For example, the wireless communication device may perform calibration adaptively when the same is powered on, or when a change in performance of the RF module is sensed.

In the case of a wireless communication device that supports the mmWave band, the RF module is, in general, implemented by two separate chips for the purpose of efficient mounting. For example, such a structure may be proposed in which the RF module is separately implemented as a front RF module (RF front-end integrated circuit (IC), RFA) and a rear RF module (ABB IC, RFB), and the RFA and the RFB are connected using a single coaxial cable.

However, it may be difficult to implement a loop back path for phase calibration in the case of a wireless communication device equipped with an RF module structured such that the RFA and the RFB are connected using a single cable. For example, almost all wireless communication devices that support the mmWave band adopt the time division multiple access (TDMA) scheme, and thus cannot perform transmission (TX) and reception (RX) simultaneously. As a result, the wireless communication device cannot simultaneously perform transmission and reception of a test signal for calibration, and it is therefore not easy to measure the performance of the RF module and to calibrate the phase on the basis thereof.

Therefore, it has been requested that, in connection with a wireless communication device that has a multi-antenna including a plurality of antenna arrays, a method be provided for calibrating the phase regarding an RF module structured such that a plurality of front RF modules and rear RF modules are separated from and connected to each other by a cable.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for forming a loop back path for phase calibration in a wireless communication device, which supports a mmWave band on the basis of a multi-antenna, and performing phase calibration therethrough.

An aspect of the present disclosure may provide an apparatus and a method for calibrating a phase on the basis of a test signal, which is fed back among a plurality of antenna arrays, in connection with a wireless communication device that has a multi-antenna.

An aspect of the present disclosure may provide, in connection with a wireless communication device having a multi-antenna including a plurality of antenna arrays, a member that feeds back a test signal among the plurality of antenna arrays and a structure having the same mounted thereon.

An aspect of the present disclosure may provide, in connection with a wireless communication device having a multi-antenna, which includes a plurality of antenna arrays, and having a radio frequency (RF) module, which includes a plurality of front RF modules and rear RF modules that are separated from and connected to each other by a cable, an apparatus and a method for calibrating a phase with regard to each chain combination formed by the plurality of antenna arrays.

In accordance with an aspect of the present disclosure, a wireless communication terminal device having a multi-antenna is provided. The wireless device includes an radio frequency (RF) module including front RF modules including first and second antenna arrays and a rear RF module independently connected to each of the front RF modules by a cable having a predetermined length, and a digital modem configured to output an input test signal to the RF module and calibrate a phase value with regard to each of chain combinations formed by the first and second antenna arrays, based on an output test signal provided from the RF module in response to the input test signal. A test signal emitted by a forward transmission antenna array of the first antenna array is transferred to a forward reception antenna of the second antenna array by a member that covers the first and second antenna arrays. Forward chain combinations that constitute the chain combination are determined by a combination of forward transmission chains, which correspond to respective transmission antennas that constitute the forward transmission antenna array, and forward reception antennas, which correspond to respective reception antennas that constitute the forward reception antenna array.

In accordance with an aspect of the present disclosure, a method for calibrating a phase in a wireless communication terminal device including front RF modules, which comprise first and second antenna arrays, and a rear RF module, which is independently connected to each of the front RF modules by a cable having a predetermined length, is provided. The method includes emitting a test signal by a forward transmission antenna array of the first antenna array, receiving the emitted test signal, which is transferred by a member that covers the first and second antenna arrays, through a forward reception antenna array of the second antenna array, and calibrating a phase value with regard to each of chain combinations formed by the first and second antenna arrays on the basis of the received test signal. Forward chain combinations that constitute the chain combination are determined by a combination of forward transmission chains, which correspond to respective transmission antennas that constitute the forward transmission antenna array, and forward reception antennas, which correspond to respective reception antennas that constitute the forward reception antenna array.

According to various proposed aspects of the present disclosure, not only calibration related to each block that constitutes an RF block, which includes a full signal path, but also calibration related to each of all RF chains may be possible. Furthermore, since calibration related to a full RF path is possible, it may also be possible to measure the phase difference in each of the RF paths and to make a system-based compensation for the same.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
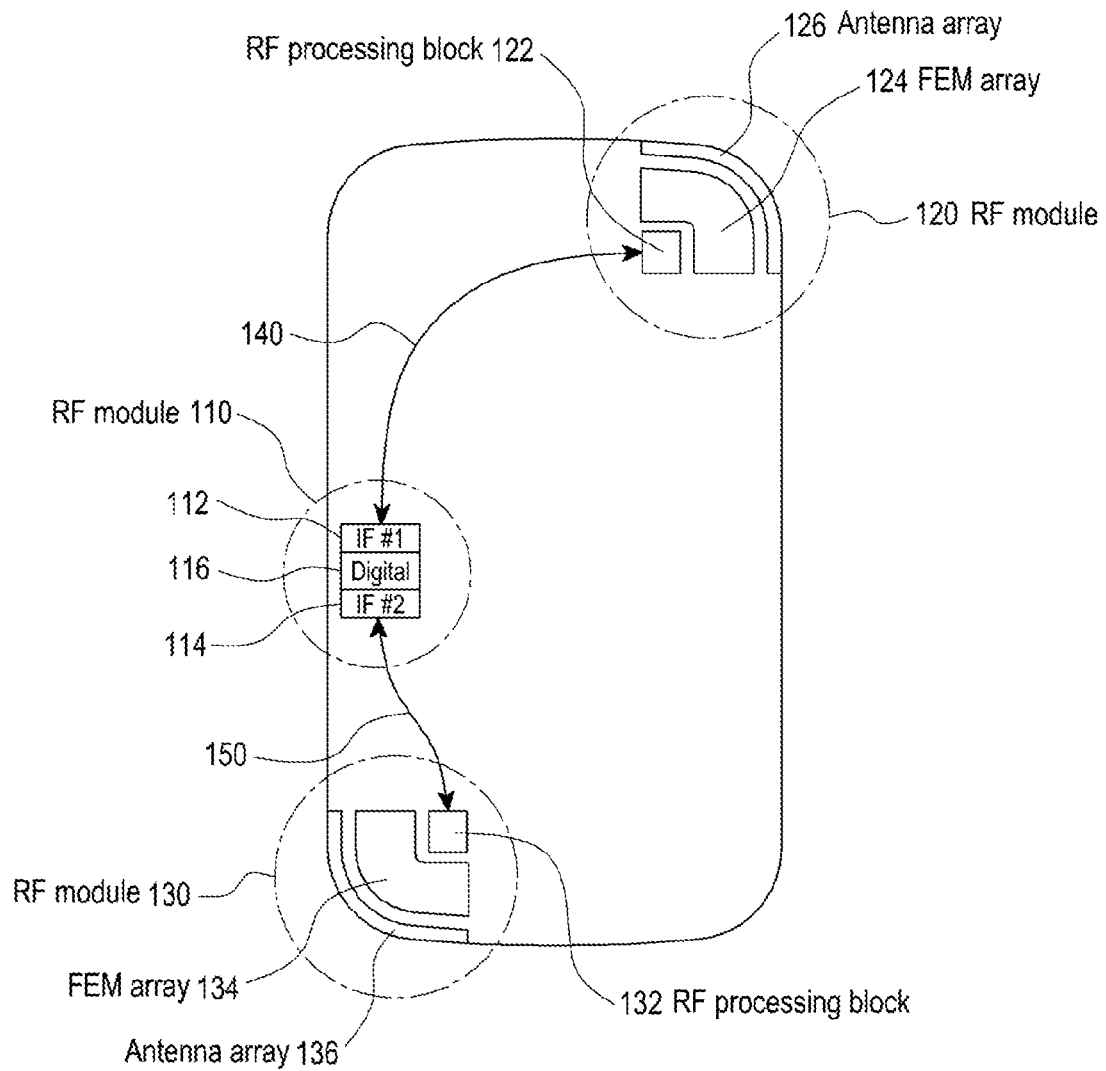
FIG. 1 is a diagram illustrating an arrangement of elements that constitute an radio frequency (RF) module in connection with a wireless communication device that supports communication in a mmWave band according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that changes various and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

As used herein, the expression "A or B", "at least one of A and/or B", or "one or more of A and/or B" may include any or all possible combinations of items enumerated together. For example, "A or B," "at least one of A and B," or "at least one of A or B" may refer to all cases of (1) including at least one A, (2) including at least one B, or (3) including both at least one A and at least one B.

The expression "a first", "a second", "the first", or "the second" used in various embodiments of the present disclosure may modify various components regardless of the order and/or the importance but does not limit the corresponding components. The above-described expressions may be used to distinguish an element from another element. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and may not be intended to limit the scope of other embodiments. As used herein, singular forms may include plural forms as well unless the context clearly indicates otherwise. Unless defined otherwise, all terms used herein, including technical terms and scientific terms, may have the same meaning as commonly understood by a person of ordinary skill in the art to which the present disclosure pertains. Terms, such as those defined in commonly used dictionaries, should be interpreted as having a meaning that is the same or similar to their meaning in the context of the relevant art and will not be interpreted in an idealized or overly formal sense unless expressly so defined herein. In some cases, even the term defined in the present disclosure should not be interpreted to exclude embodiments of the present disclosure.

In various embodiments to be described below, various schemes for performing calibration with regard to a full path will be proposed.

A scheme to be proposed in various embodiments may be a phase calibration scheme that can be applied to a wireless communication device that has a multi-antenna, which includes a plurality of antenna arrays. To this end, a transmission antenna array and a reception antenna array, which constitute the plurality of antenna arrays, may be connected using a member. The connection that uses a member may be used as a full path for phase calibration. The member may be a passage that forms a path for transferring a test signal, which is emitted by the transmission antenna array, to the reception antenna array.

In connection with the plurality of antenna arrays, the transmission antenna array, and the reception antenna array, "an antenna array" may refer to a structure obtained by grouping a predetermined number of antennas into a bundle and arranging the same for transmission and reception of signals. In this case, each of the antennas that constitute the antenna array has a predetermined direction, and may play the role of transmitting or receiving signals in the corresponding direction.

The plurality of antenna arrays may be separated into at least two multi-antenna groups. For example, when separated into two multi-antenna groups (multi-antenna groups #1 and #2), each multi-antenna group may include one transmission antenna group and one reception antenna group. In this case, a full path for phase calibration may be divided into a forward path and a reverse path.

The transmission antenna array of the transmission antenna group is a set of transmission antennas, which have a predetermined array, and which emits a test signal for calibration on the basis of the same. The reception antenna array is a set of reception antennas, which have a predetermined array, and which receives a test signal for calibration on the basis of the same.

For example, a radio frequency (RF) module included in a wireless communication device may include two communication paths. The two communication paths may correspond to two multi-antenna groups (multi-antenna group #1 and multi-antenna group #2), into which multi-antennas are classified.

Each of the two communication paths may include one transmission path and one reception path. It is to be noted in the following description that, for convenience of description, the two multi-antenna groups (multi-antenna group #1 and multi-antenna group #2) are meant to refer to the two communication paths included in the RF module.

In this case, the full path for calibration may include a full path formed by a transmission path included in the multi-antenna group #1 and a reception path included in the multi-antenna group #2 (hereinafter referred to as "a forward path") and a full path formed by a transmission path included in the multi-antenna group #2 and a reception path included in the multi-antenna group #1 (hereinafter referred to as "a reverse path").

In the proposed embodiments, phase calibration may be performed with regard to each chain combination in each of the forward path and the reverse path. However, the order of phase calibration with regard to the forward path and the reverse path may be selectively applied as needed.

Hereinafter, various embodiments of the present disclosure are be described in detail with reference to the accompanying drawings.

FIG. 1 illustrates an arrangement of elements that constitute an RF module in connection with a wireless communication device that supports communication in a mmWave band according to an embodiment of the present disclosure.

Referring to FIG. 1, the RF module may include two front RF modules (RF front-ends, RFA) 120 and 130 and one rear RF module 110, and may be structured such that the two front RF modules 120 and 130 and the rear RF module 110 are connected by feed lines 140 and 150, respectively. Each of the two front RF modules 120 and 130 may be positioned at one of four corners of the wireless communication terminal.

The kind of the feed lines 140 and 150 may be determined in view of ease of installation in a limited space, transfer characteristics thereof, etc. A coaxial cable may be used as the feed lines 140 and 150 that can be easily installed, in view of the layout inside the wireless communication terminal, etc., and do not generate any loss of signals transferred therein.

According to the above-mentioned structure, the single rear RF module 110 may transmit/receive signals with the first front RF module 120 through the first feed line 140. The single rear RF module 110 may transmit/receive signals with the second front RF module 130 through the second feed line 150. The first feed line 140 and the second feed line 150 may have predetermined lengths for optimal arrangement. In this case, the length of the first feed line 140 is not necessarily identical to that of the second feed line 150. The first feed line 140 and the second feed line 150 may have different design lengths.

The front RF modules 120 and 130 may include RF processing blocks 122 and 132, front-end module (FEM) arrays 124 and 134, and antenna arrays 126 and 136, respectively. The rear RF module 110 may include at least two intermediate frequency (IF) processing blocks 112 and 114 and a digital processing block 116. Each of the IF processing blocks 112 and 114, which are included in the rear RF module 110, may process signals to be transmitted/received with one of the front RF modules 120 and 130.

The antenna arrays 126 and 136, which are included in the front RF modules 120 and 130, may constitute a multi-antenna of the wireless communication terminal. Each of the antenna arrays 126 and 136 may include a transmission antenna array and a reception antenna array. In this case, it may be possible to form both a forward path and a reverse path for the purpose of phase calibration.

For example, the forward path may be a path along which a signal transmitted by a transmission antenna array of the first front RF module 120 is received by a reception antenna array of the second front RF module 130. The reverse path may be a path along which a signal transmitted by a transmission antenna array of the second front RF module 130 is received by a reception antenna array of the first front RF module 120. The signal transmitted by the transmission antenna array of the first front FR module 120, or the signal transmitted by the transmission antenna array of the second front RF module 130, may be a test signal supplied from the rear RF module 110 for the purpose of phase calibration.

However, the forward path and the reverse path are not limited to paths that connect a transmission antenna array and a reception antenna array. The forward path and the reverse path may be interpreted as including not only a path that connects transmission/reception antenna arrays, but also a path, along which signals are transferred from the rear RF module 110 to a transmission antenna array, and a path, along which signals received by a reception antenna array are transferred to the rear RF module 110.

Figure 2:
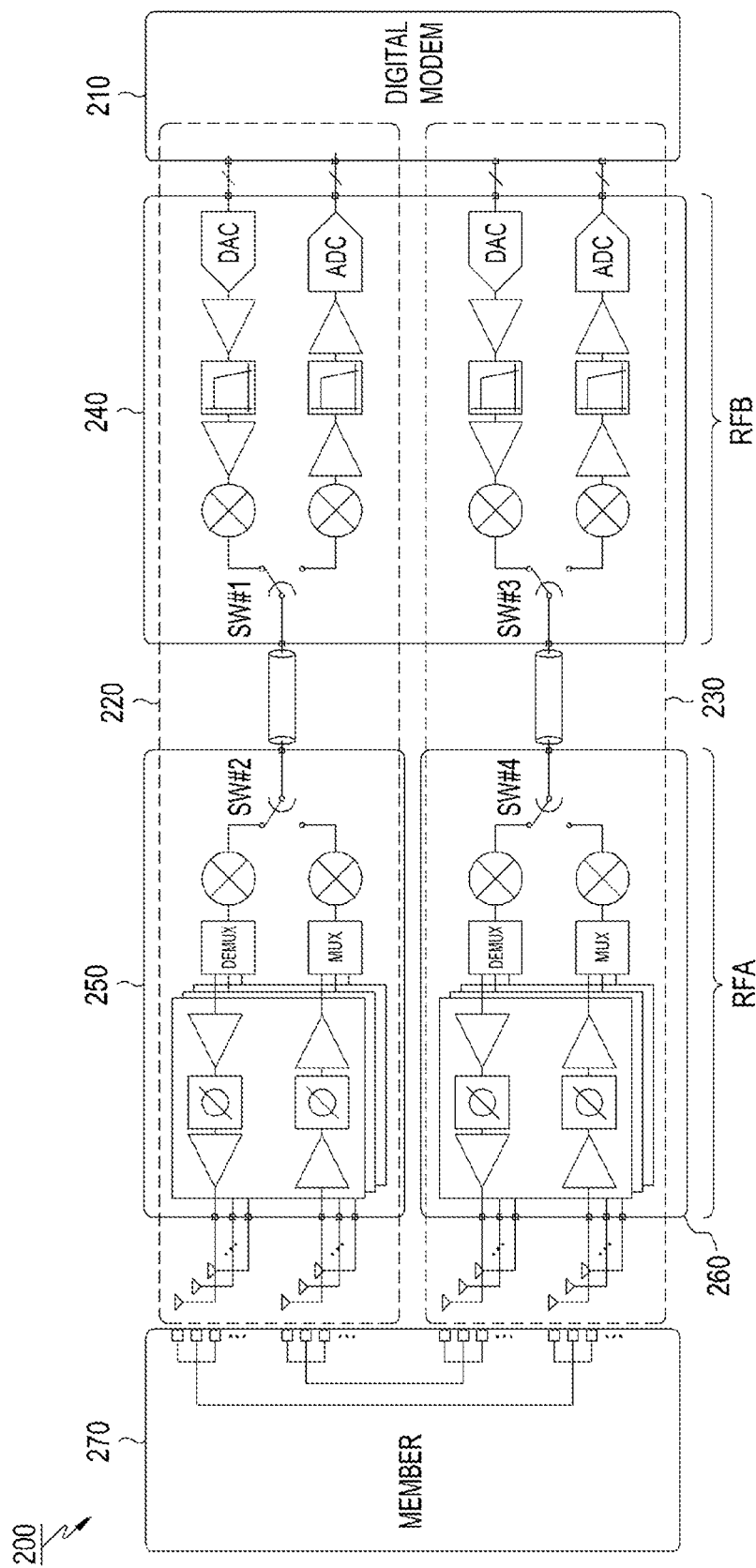
FIG. 2 is a diagram illustrating an configuration of a phase calibration device according to an embodiment of the present disclosure.

FIG. 2 illustrates a configuration of a phase calibration device according to an embodiment of the present disclosure.

Referring to FIG. 2, the phase calibration device 200 may include a digital modem 210, an RF module, and a member 270. The digital modem 210 may output a test signal for calibration to the RF module and, on the basis of a test signal that is fed back in response to output of the test signal through the RF module, may perform phase calibration with regard to each of chain combinations that can be formed by the multi-antenna. This requires a pre assumption that the phase calibration device 200 has a 2*2 or larger multi-antenna (multiple input multiple output (MIMO)) structure. As used herein, the 2*2 or MIMO structure means that at least two multi-antenna groups 220 and 230 are provided to perform transmission and reception of signals simultaneously. In general, the multi-antenna group may be interchangeable with the term "MIMO channel".

The RF modem may include one rear RF modem (RFB) 240 and at least two front RF modems (RFA). It is herein assumed, for example, that the RF modem includes two front RF modems 250 and 260. However, operations in the following description are not necessarily limited to the case of two front RF modems.

The rear RF modem 240 may include a path for processing transmitted signals (transmission path) and a path for processing received signals (reception path) so as to correspond to the two front RF modems 250 and 260, respectively. The transmission path may include features for signal type conversion (D/A conversion), amplification, filtering, mixing, etc., with regard to transmitted signals. The reception path may include features for mixing, amplification, filtering, signal type conversion (A/D conversion), etc., with regard to received signals.

The rear RF modem 240 may include operation switches SW#1 and SW#3, which correspond to the two front RF modems 250 and 260, respectively. The operation switches SW#1 and SW#3 may connect one of the transmission path and the reception path with the front RF modems 250 and 260. In this case, the operation switches SW#1 and SW#3 neither connect the transmission path to both of the two front RF modems 250 and 260 nor connect the reception path to both thereof. When the first operation switch SW#1 has connected the transmission path to the first front RF modem 250, the third operation switch SW#3 connects the reception path to the second front RF modem 260. The opposite connection is also possible.

Each of the front RF modems 250 and 260 may include a path for processing transmitted signals (transmission path) and a path for processing received signals (reception path). The transmission path may include features for amplification, filtering, mixing, etc., with regard to transmitted signals. The reception path may include features for mixing, amplification, filtering, etc., with regard to received signals.

The front RF modems 250 and 260 may include operation switches SW#2 and SW#4, which connect the rear RF modem 240, respectively. The operation switches SW#2 and SW#4 may connect one of the transmission path and the reception path with the rear RF modem 240. In this case, the operation switches SW#2 and SW#4 cannot connect the same path with the rear RF modem 240. When the second operation switch SW#2 has connected the transmission path to the rear RF modem 240, the fourth operation switch SW#4 connects the reception path to the rear RF modem 240. The opposite connection is also possible.

Each of the front RF modems 250 and 260 may transmit or receive signals through a connection with an antenna array, which constitutes a multi-antenna. For example, the first front RF modem 250 may be coupled to a first antenna array, and the second front RF modem 260 may be coupled to a second antenna array. In this case, each of the first and second antenna arrays may include a transmission antenna array and a reception antenna array.

The transmission antenna array of the first antenna array may constitute forward transmission chains, and the reception antenna array of the first antenna array may constitute reverse reception chains. The transmission antenna array of the second antenna array may constitute reverse transmission chains, and the reception antenna array of the second antenna array may constitute forward reception chains.

For example, a forward transmission chain may be configured so as to correspond to each of transmission antennas, which are included in the transmission antenna array of the first antenna array, and a reverse reception chain may be configured so as to correspond to each of reception antennas, which are included in the reception antenna array of the first antenna array. Furthermore, a reverse transmission chain may be configured so as to correspond to each of transmission antennas, which are included in the transmission antenna array of the second antenna array, and a forward reception chain may be configured so as to correspond to each of reception antennas, which are included in the reception antenna array of the second antenna array.

A combination of the forward transmission chains, which are configured by the transmission antenna array of the first antenna array, and the forward reception chains, which are configured by the reception antenna array of the second antenna array, may be a forward chain combination, which is a phase calibration target. In addition, a combination of the reverse transmission chains, which are configured by the transmission antenna array of the second antenna array, and the reverse reception chains, which are configured by the reception antenna array of the first antenna array, may be a reverse chain combination, which is a phase calibration target.

For example, the forward chain combination may be configured by coupling of each of the forward transmission chains and each of the forward reception chains, and the reverse chain combination may be configured by coupling of each of the reverse transmission chains and each of the reverse reception chains.

Therefore, in the various proposed embodiments, it is possible to independently perform phase calibration with regard to each forward chain combination and phase calibration with regard to each reverse chain combination in a cyclic manner. This requires a pre assumption that the operation switches SW#2 and SW#4, which are provided in the front RF modules 250 and 260, respectively, and the operation switches SW#1 and SW#3, which are provided in the rear RF module 240, operate as described above.

The member 270 may transfer signals (test signals, etc.), which are transmitted or emitted from the forward or reverse transmission chains, to the forward or reverse reception chains. That is, the member 270 may server as a passage for transferring signals between the first antenna array and the second antenna array.

The material, size, shape, etc., of the member 270 are not particularly limited, as long as the same can transfer radio signals with as little loss as possible. However, it may be preferred to determine the material, size, shape, etc., in view of the place and method to use the same, etc. For example, the member 270 may be a waveguide, a metal housing, etc.

The member 270 has a transmission structure that enables the same to transfer signals while minimizing loss in high frequencies. This makes it possible to fabricate a member 270 that corresponds to a calibration tool, which is suitable for an antenna array mounted on a wireless communication terminal. Using a waveguide as the member 270 may be preferably applied when performing calibration with regard to the full path, including the antenna and the feed line, in the product manufacturing step. Using a metal housing as the member 270 may be preferably applied to calibration, which is to be performed when a performance change resulting from an influence of temperature, voltage, or the like is sensed while the product is used.

Figure 3:
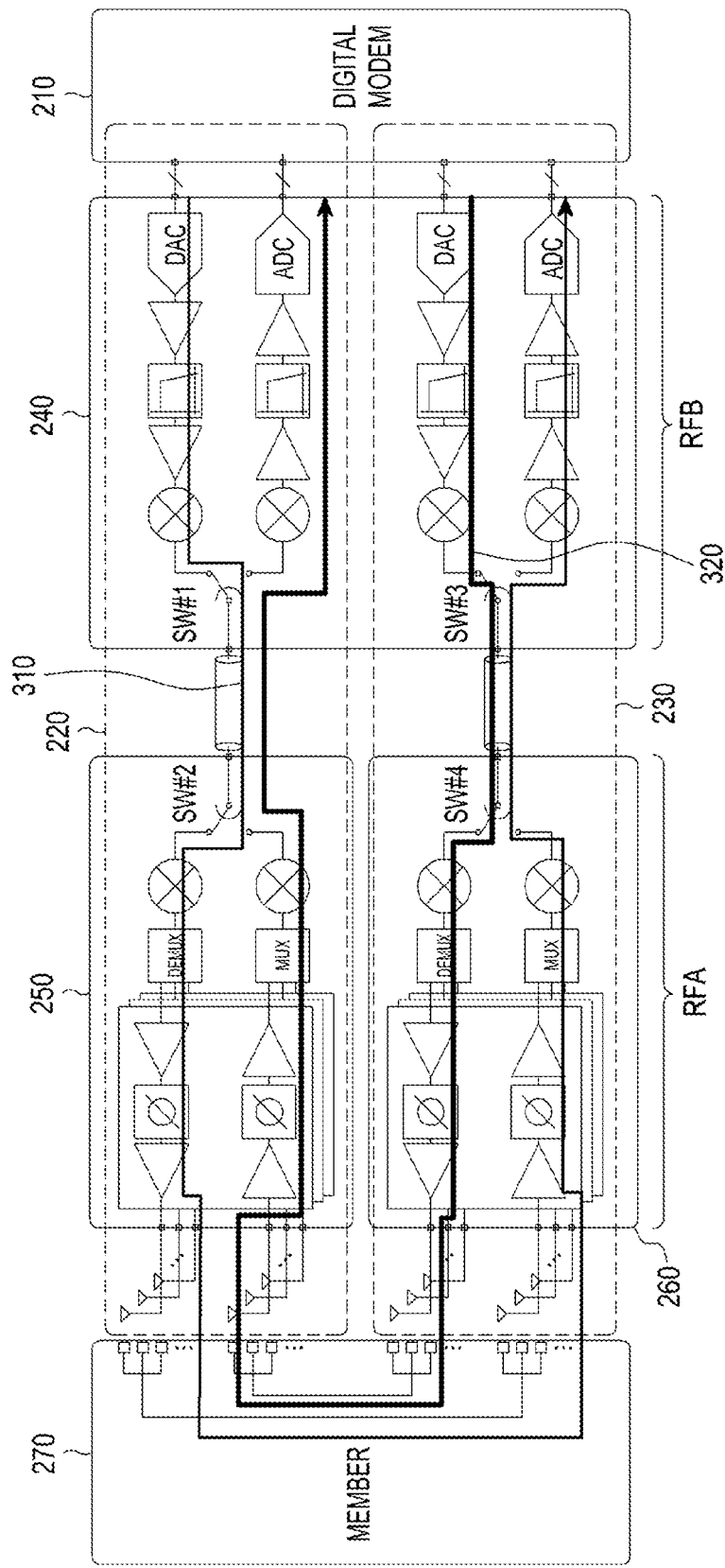
FIG. 3 is a diagram illustrating an example of performing phase calibration with regard to a full path in connection with a phase calibration device according to an embodiment of the present disclosure.

FIG. 3 illustrates an example of performing phase calibration with regard to a full path in connection with a phase calibration device according to various embodiments.

Referring to FIG. 3, the full path for phase calibration may include a forward path 310 and a reverse path 320.

The forward path 310 may include a transmission path, which is configured by digital antenna group #1 220, and a reception path, which is configured by digital antenna group #2 230.

The transmission path, which is configured by the digital antenna group #1 220, may be formed by an operation switch SW#1 and an operation switch SW#2. For example, the operation switch SW#1 connects the transmission path of the rear RF modem 240 with a feed line such that a test signal, which is output by the digital model 210, can be transferred to the first front RF modem 250 through the feed line. The operation switch SW#2 connects the feed line with the transmission path of the first front RF modem 250 such that a test signal, which has been transferred from the rear RF modem 240 through the feed line, can be emitted through the forward transmission antenna array that constitutes the first antenna array. The test signal can be transmitted with regard to each chain that corresponds to each of the transmission antennas that constitute the forward transmission antenna array.

The transmission path, which is configured by the digital antenna group #2 230, may be formed by an operation switch SW#4 and an operation switch SW#3. For example, the operation switch SW#4 connects the reception path of the second front RF modem 260 with a feed line such that a test signal, which has been received through a forward reception antenna array that constitutes the second antenna array, can be transferred to the rear RF modem 240 through the feed line. The operation switch SW#3 connects the feed line with the reception path of the rear RF modem 240 such that a test signal, which has been transferred from the second front RF modem 260 through the feed line, can be provided to the digital modem 210 through the reception path of the rear RF modem 240.

The digital modem 210 performs phase calibration with regard to the corresponding forward chain combination on the basis of a test signal received with regard to each forward chain combination.

The reverse path 320 may include a transmission path, which is configured by digital antenna group #2 230, and a reception path, which is configured by digital antenna group #1 220.

The transmission path, which is configured by the digital antenna group #2 230, may be formed by an operation switch SW#3 and an operation switch SW#4. For example, the operation switch SW#3 connects the transmission path of the rear RF modem 240 with a feed line such that a test signal, which is output by the digital model 210, can be transferred to the second front RF modem 260 through the feed line. The operation switch SW#4 connects the feed line with the transmission path of the second front RF modem 260 such that a test signal, which has been transferred from the rear RF modem 240 through the feed line, can be emitted through the reverse transmission antenna array that constitutes the second antenna array. The test signal can be transmitted with regard to each chain that corresponds to each of the transmission antennas that constitute the reverse transmission antenna array.

The transmission path, which is configured by the digital antenna group #1 220, may be formed by an operation switch SW#2 and an operation switch SW#1. For example, the operation switch SW#2 connects the reception path of the first front RF modem 250 with a feed line such that a test signal, which has been received through a reverse reception antenna array that constitutes the first antenna array, can be transferred to the rear RF modem 240 through the feed line. The operation switch SW#1 connects the feed line with the reception path of the rear RF modem 240 such that a test signal, which has been transferred from the first front RF modem 250 through the feed line, can be provided to the digital modem 210 through the reception path of the rear RF modem 240.

The digital modem 210 performs phase calibration with regard to the corresponding reverse chain combination on the basis of a test signal received with regard to each reverse chain combination.

Figure 4:
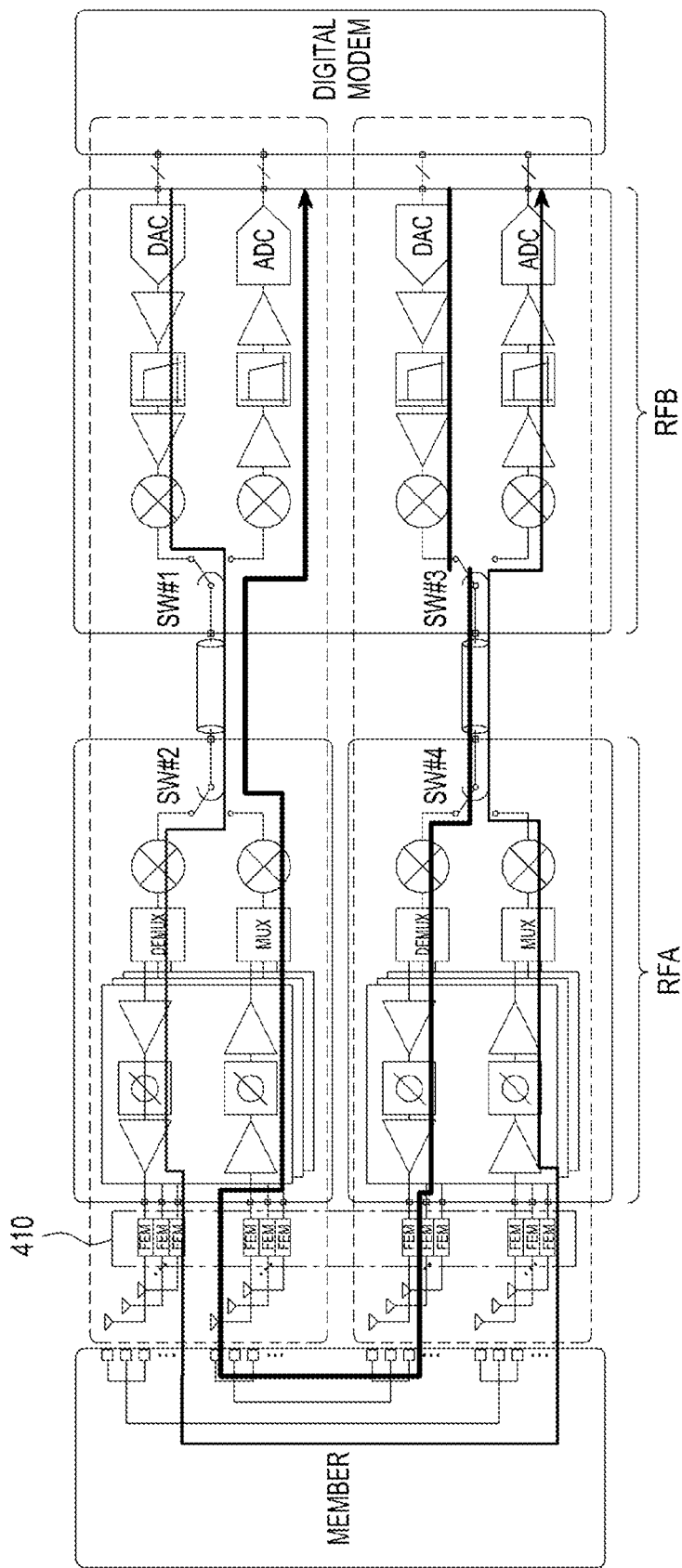
FIG. 4 is a diagram illustrating another example of performing phase calibration with regard to a full path in connection with a phase calibration device according to an embodiment of the present disclosure.

FIG. 4 illustrates another example of performing phase calibration with regard to a full path in connection with a phase calibration device according to an embodiment of the present invention.

Referring to FIG. 4, the example illustrated is identical to the example described with reference to FIG. 3 in terms of the operation, except that FEMs 410 are configured between respective antennas that constitute an antenna array and the front RF module.

Figure 5:
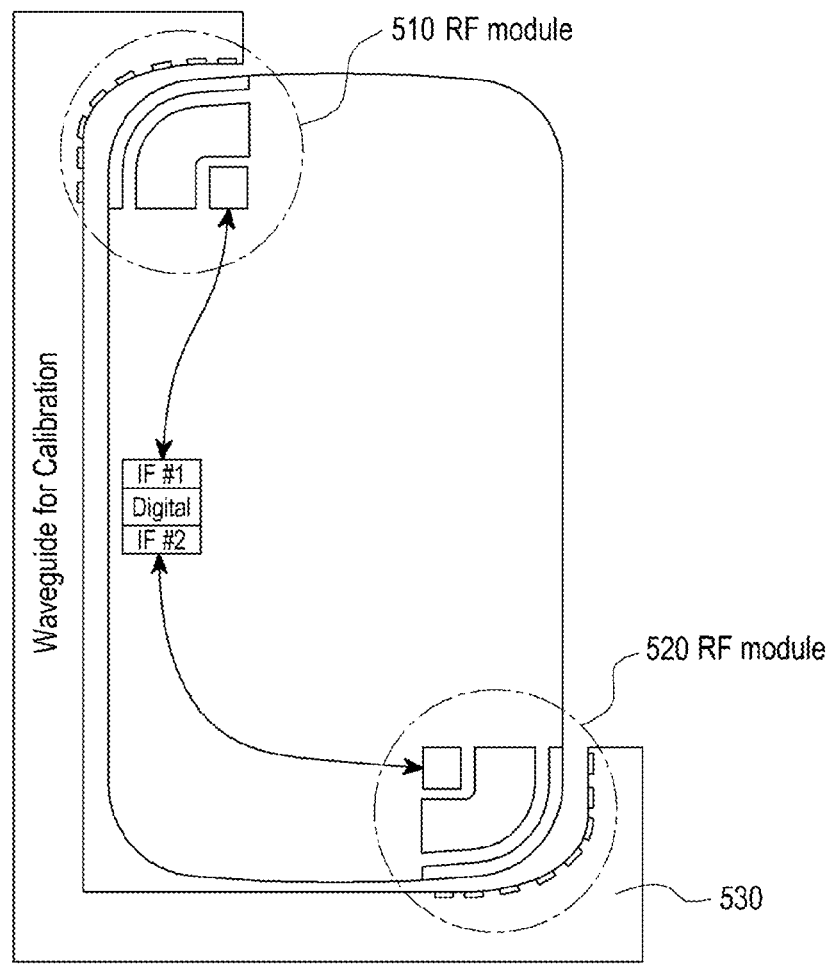
FIG. 5 is a diagram illustrating an use of a waveguide as a member in connection with a wireless communication terminal according to an embodiment of the present disclosure.

FIG. 5 illustrates a use of a waveguide as a member in connection with a wireless communication terminal according to an embodiment of the present disclosure.

Referring to FIG. 5, it is assumed that two front RF modules 510 and 520 are positioned at two diagonally positioned corners, respectively, among four corners of the wireless communication terminal. In this case, fasteners provided on both sides of a waveguide 530 may be one-to-one fastened to the two front RF modules 510 and 520. The waveguide 530 may transfer signals using a structure configured by a hollow center and a conductive wall.

One of the fasteners provided on both sides of the waveguide 530 receives a test signal input from one of the two front RF modules 510 and 520, and the other fastener outputs the test signal to the other front RF module. To this end, the fasteners provided on both sides of the waveguide 530 need to be firmly forced against and fastened to antenna arrays of the corresponding front RF modules, respectively, so as not to generate loss of signals that are input and output.

Figure 6:
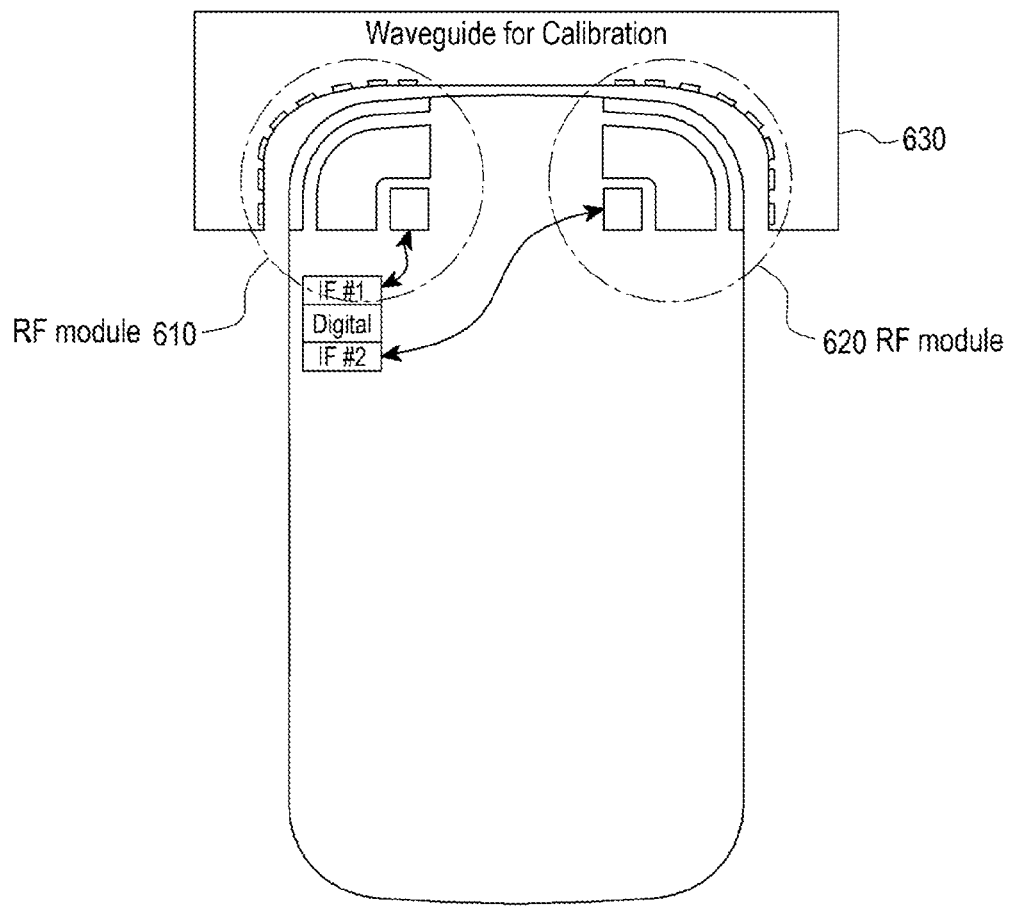
FIG. 6 is a diagram illustrating another use of a waveguide as a member in connection with a wireless communication terminal according to an embodiment of the present disclosure.

FIG. 6 illustrates another use of a waveguide as a member in connection with a wireless communication terminal according to an embodiment of the present disclosure.

Referring to FIG. 6, the example illustrated may have the same structure as that illustrated in FIG. 5, except that two front RF modules 610 and 620 are installed in different positions on the wireless communication terminal. The two front RF modules 610 and 620 are positioned in parallel with each other on corners of one side of the wireless communication terminal, and the configuration of the waveguide 630, which serves as a test signal transfer path, may have a simpler structure than the waveguide illustrated in FIG. 5.

Figure 7:
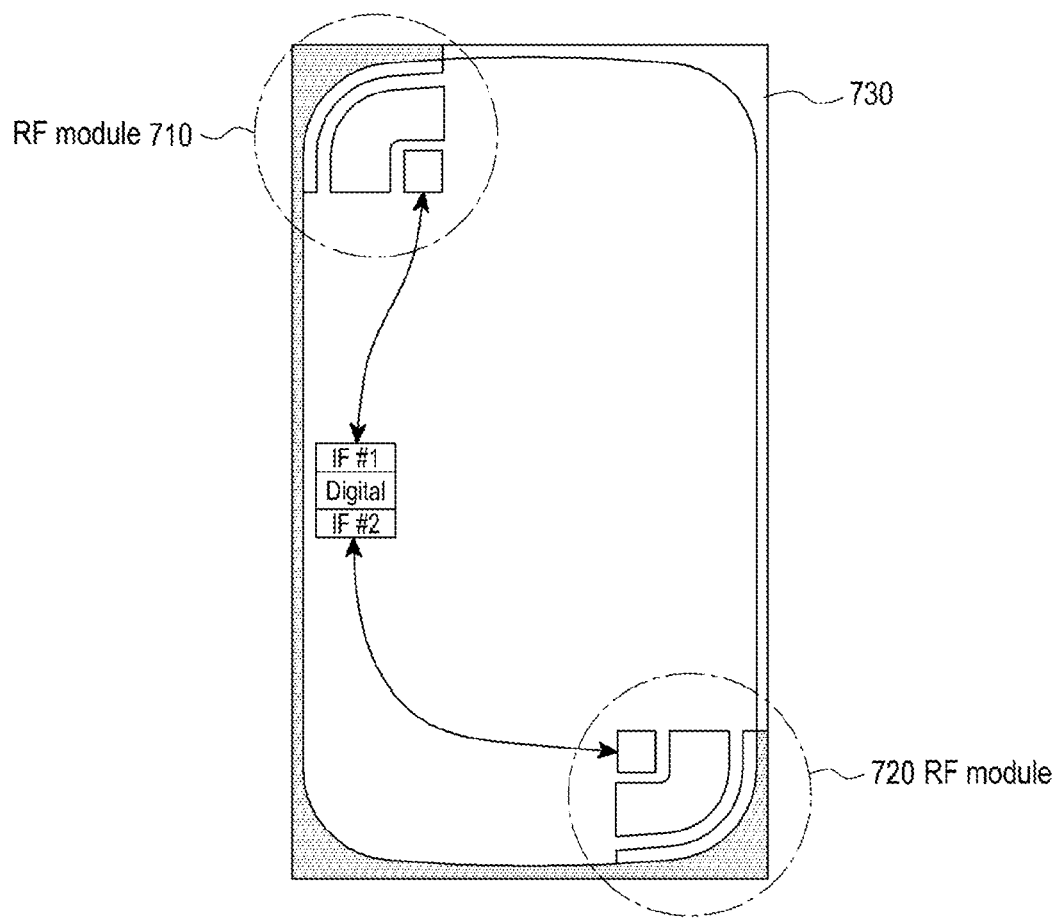
FIG. 7 is a diagram illustrating an use of a metal housing as a member in connection with a wireless communication terminal according to an embodiment of the present disclosure.

FIG. 7 illustrates a use of a metal housing as a member in connection with a wireless communication terminal according to an embodiment of the present disclosure.

Referring to FIG. 7, the metal housing 730 may be used to protect side surfaces of the wireless communication terminal and for the purpose of product design. For example, the metal housing 730 may be structured such that side surfaces of the wireless communication terminal are surrounded using a metallic material. In this case, the metal housing 730 may play the role of a passage for transferring test signals, which are emitted by transmission antennas that constitute a transmission antenna array for the purpose of phase calibration, to reception antennas that constitute a reception antenna array.

For example, it is assumed that two front RF modules 710 and 720 are positioned at two diagonally positioned corners, respectively, among four corners of the wireless communication terminal. In this case, a groove that corresponds to the passage may be formed on the inside of the metal housing 730, particularly on the inner surface thereof that contacts the wireless communication terminal, along an interval between the two front RF modules 710 and 720.

Figure 8:
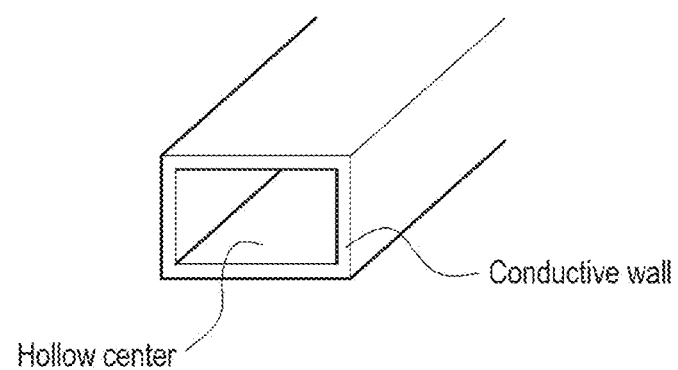
FIG. 8 is a diagram illustrating the structure of a waveguide that is to be used as a member for making a path, which corresponds to a wireless interval, among a full path for phase calibration according to an embodiment of the present disclosure.

FIG. 8 illustrates the structure of a waveguide that is to be used as a member for making a path, which corresponds to a wireless interval, among a full path for phase calibration according to an embodiment of the present disclosure.

Referring to FIG. 8, the waveguide has a structure configured by a hollow center and a conductive wall, the waveguide being used as a member for transferring test signals, which have been emitted from transmission antennas that constitute a transmission antenna array, to reception antennas that constitute a reception antenna array.

Figure 9:
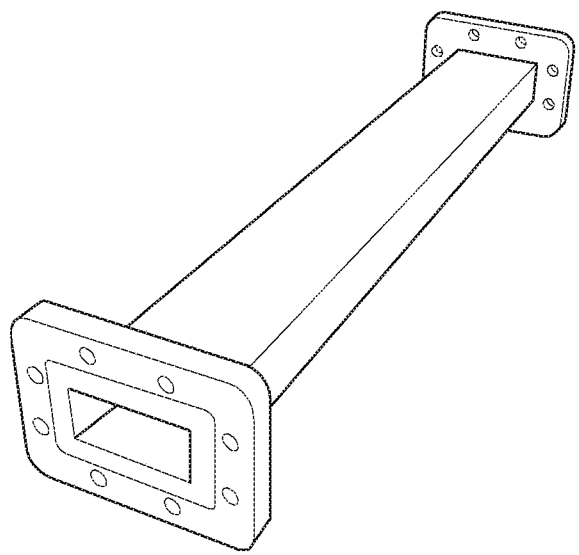
FIG. 9 is a diagram illustrating the actual model of a waveguide that can be used as a member for making a path, which corresponds to a wireless interval, among a full path for phase calibration according to an embodiment of the present disclosure.

FIG. 9 illustrates the actual model of a waveguide that can be used as a member for making a path, which corresponds to a wireless interval, among a full path for phase calibration according to an embodiment of the present disclosure.

Figure 10:
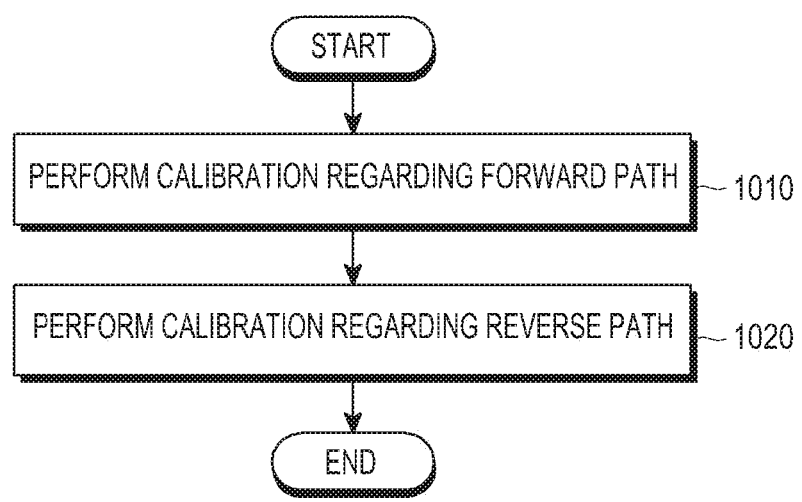
FIG. 10 is a diagram illustrating a control flow for performing phase calibration in connection with a wireless communication terminal according to an embodiment of the present disclosure.

FIG. 10 illustrates a control flow for performing phase calibration in connection with a wireless communication terminal according to various embodiments.

Referring to FIG. 10, when it is determined that phase calibration is necessary, the wireless communication terminal performs phase calibration in a full path, which corresponds to a forward path, in operation 1010. For example, the wireless communication terminal may use various sensors in order to determine whether phase calibration is necessary. A temperature sensor may be used to measure the ambient temperature, and it may be determined whether phase calibration is necessary or not in view of a change in the measured temperature.

The wireless communication terminal may have a forward path configured by a transmission path of multi-antenna group #1, which is configured by a rear RF module and a first front RF module, and a reception path of multi-antenna group #2, which is configured by a second front RF module and the rear RF module. The wireless communication terminal performs phase calibration with regard to each of multiple chain combinations included in the forward path. Characteristics (e.g., phase) of a test signal, which is fed back through the full path corresponding to each chain combination included in the forward path, may be analyzed, and phase calibration may be performed with regard to the corresponding chain combination on the basis of the result of analysis.

The multiple chain combinations refer to combinations of transmission chains, which are configured by transmission antennas that constitute a transmission antenna array of a first antenna array, and reception chains, which are configured by reception antennas that constitute a reception antenna array of a second antenna array.

After completion of phase calibration related to the forward path, the wireless communication terminal performs phase calibration in a full path, which corresponds to a reverse path, in operation 1020. For example, the wireless communication terminal has a reverse path configured by a transmission path of multi-antenna group #2, which is configured by a rear RF module and a second front RF module, and a reception path of multi-antenna group #1, which is configured by a first front RF module and the rear RF module. The wireless communication terminal performs phase calibration with regard to each of multiple chain combinations included in the reverse path. Characteristics (e.g., phase) of a test signal, which is fed back through the full path corresponding to the chain combination included in each reverse path, may be analyzed, and phase calibration may be performed with regard to the corresponding chain combination on the basis of the result of analysis.

The multiple chain combinations refer to combinations of transmission chains, which are configured by transmission antennas that constitute a transmission antenna array of a second antenna array, and reception chains, which are configured by reception antennas that constitute a reception antenna array of a first antenna array.

It has been assumed in the previously proposed embodiment of the present disclosure that phase calibration is preferentially performed with regard to chain combinations in the forward path, and phase calibration is then performed with regard to chain combinations in the reverse path. In other words, primary calibration is performed with regard to the forward path, which is configured by the transmission path of digital antenna group #1, the path configured by the member, and the reception path of digital antenna group #2, and secondary calibration is performed with regard to the reverse path, which is configured by the transmission path of digital antenna group #2, the path configured by the member, and the reception path of digital antenna group #1.

However, the order of performing phase calibration in the forward path and the reverse path may also be varied. It is also possible to preferentially perform phase calibration with regard to chain combinations in the reverse path and then to perform phase calibration with regard to chain combinations in the forward path.

It will be assumed in the following description that, for convenience of description, phase calibration is performed with regard to the forward path, and phase calibration is then performed with regard to the reverse path. However, it would be obvious that, even if phase calibration is performed in the opposite order, the same application can be made.

Figure 11:
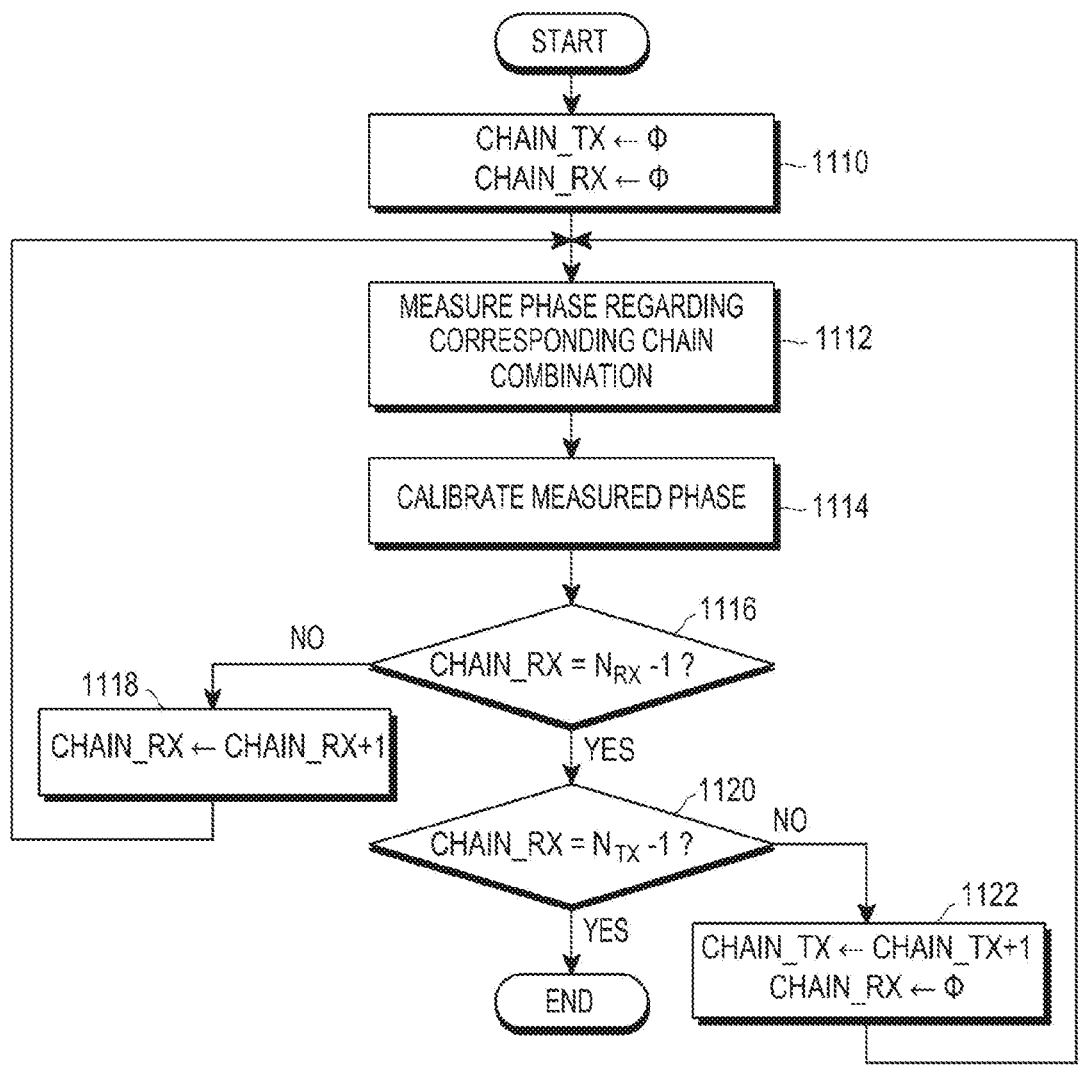
FIG. 11 is a diagram illustrating a control flow for performing phase calibration with regard to a forward path or a reverse path in connection with a wireless communication terminal according to an embodiment of the present disclosure.

FIG. 11 illustrates a control flow for performing phase calibration with regard to a forward path or a reverse path in connection with a wireless communication terminal according to an embodiment of the present disclosure.

Referring to FIG. 11, the wireless communication terminal initializes transmission and reception chain indices CHAIN_TX and CHAIN_RX, in order to successively select chain combinations included in a full path (forward path or reverse path), which is the phase calibration target (operation 1110). For example, the transmission chain index CHAIN_TX is set to the initial value "0", and the reception chain index CHAIN_RX is set to the initial value "0".

Before or after initializing the transmission and reception chain indices CHAIN_TX and CHAIN_RX, the wireless communication terminal may control operation switches, which are provided in the front and rear RF modules, so as to form a full path (forward path or reverse path) that corresponds to the phase calibration target path.

For example, the forward path may be formed by selecting a transmission path from transmission/reception paths that constitute multi-antenna group #1 (first MIMO channel) and selecting a reception path from transmission/reception paths that constitute multi-antenna group #2 (second MIMO channel). In addition, the reverse path may be formed by selecting a transmission path from transmission/reception paths that constitute multi-antenna group #2 (second MIMO channel) and selecting a reception path from transmission/reception paths that constitute multi-antenna group #1 (first MIMO channel).

The wireless communication terminal performs phase calibration with regard to the full path (forward path or reverse path) (operations 1112 to 1122). The phase calibration with regard to the full path may be performed by measuring the phase with regard to each of combinations of all chains that constitute the transmission path and all chains that constitute the reception path, and by conducting calibration using the measured phase as a reference phase value. This requires that a reference phase value be set, chain combinations, the phase of which is to be measured, be selected successively, and the phase that has been measured with regard to the selected chain combination be calibrated using the reference phase value that has been set.

The wireless communication terminal may measure the phase with regard to a chain combination "CHAIN_TX #n, CHAIN_RX #m", which has been selected by transmission and reception chain indices CHAIN_TX #n, CHAIN_RX #m (operation 1112). In this case, "n", which determines the transmission chain index, has a range "0≤n<NTX"; "NTX" refers to the entire number of transmission chains that constitute a transmission path that forms a full path; "m", which determines the reception chain index, has a range "0≤m<NRX"; and "NRX" refers to the entire number of reception chains that constitute a reception path that forms a full path.

It will be assumed in the following description that, for convenience of description, the transmission chain index CHAIN_TX #n is fixed, and the reception chain index CHAIN_RX #m is successively increased, thereby selecting a chain combination. However, the same implementation can also be made by fixing the reception chain index CHAIN_RX #m and successively increasing the transmission chain index CHAIN_TX #n, thereby selecting a chain combination.

The phase calibration is conducted with regard to a signal that has been fed back in response to a test signal, which has been transmitted to a full path that has been formed. For example, the wireless communication terminal may measure the phase on the basis of phase changes of a transmitted test signal and a feedback signal that has been received in response thereto.

During the initial phase measurement, the phase is measured with regard to the first chain combination "CHAIN_TX #0, CHAIN_RX #0", because the transmission and reception chain indices CHAIN_TX, CHAIN_RX are set to initial values.

The wireless communication terminal may set the phase value, which has been measured with regard to the first chain combination, as the reference phase value. However, it is also possible to set the reference phase value as an arbitrary value or to set a phase value, which has been measured with regard to an arbitrarily selected chain combination other than the first chain combination, as the reference phase value.

The wireless communication terminal calibrates the phase that has been measured with regard to the selected chain combination in operation 1114. If the selected chain combination is the first chain combination, and if the phase value measured with regard to the first chain combination is used as the reference phase value, calibration for the phase value that has been measured with regard to the first chain combination may be omitted. However, if the reference phase value has been set in advance or is provided in another manner, calibration for the phase value that has been measured with regard to the first chain combination is not supposed to be omitted.

After the measured phase has been calibrated, the wireless communication terminal determines whether phase calibration has been conducted or not with regard to chain combinations formed by all chains that constitute the reception path (reception path of multi-antenna group #2) of the full path in operation 1116. For example, the wireless communication terminal may determine whether phase calibration has been conducted or not with regard to chain combinations formed by one reference transmission chain and all reception chains, on the basis of whether the condition "'CHAIN_RX=NRX-1" is satisfied or not.

If phase calibration of chain combinations formed by all reception chains has not been completed, the wireless communication terminal increases the reception chain index CHAIN_RX by 1 in operation 1118, in order to select the next chain combination for phase calibration.

The wireless communication terminal, when a new chain combination is selected, measures the phase with regard to the newly selected chain combination in operation 1112. The wireless communication terminal performs calibration with regard to the measured phase value using a preset reference phase value in operation 1114. For example, the wireless communication terminal determines whether phase calibration is necessary or not on the basis of whether the measured phase value is identical to the reference phase value or not.

When it is determined that phase calibration is necessary, the wireless communication terminal may adjust at least one parameter value related to features within the RF module, thereby performing phase calibration, such that the measured phase value is identical or close to the reference phase value. However, when it is determined that phase calibration is unnecessary, the wireless communication terminal may proceed to an operation for performing phase calibration with regard to the next chain combination.

When phase calibration has been completed with regard to chain combinations formed by one transmission chain and all reception chains, the wireless communication terminal determines whether phase calibration has been completed or not with regard to all chain combinations that constitute the forward path in operation 1120. For example, the wireless communication terminal may determine whether phase calibration has been completed or not with regard to chain combinations formed by one transmission chain and all reception chains, on the basis of whether the condition "'CHAIN_RX=NRX-1" is satisfied.

If phase calibration has not been completed with regard to all chain combinations, the wireless communication terminal increases the transmission chain index CHAIN_TX by 1, in order to select the next phase calibration target chain combination, and initializes the reception chain index CHAIN_RX in order to successively select reception chains that constitute a reception path of the forward path in operation 1122. For example, the reception chain index CHAIN_RX is set to the initial value "0".

In this manner, the wireless communication terminal can perform phase calibration with regard to chain combinations formed by a transmission chain, which corresponds to the updated transmission chain index, and respective reception chains in operations 1112 to 1118.

As described above, the wireless communication terminal successively selects each of combinations formed by transmission chains and reception chains, which constitute a forward or reverse path, thereby performing phase calibration. Various schemes for successively selecting target chain combinations for phase calibration from all chain combinations, for the purpose of the phase calibration, may be provided in addition to the previously proposed scheme.

It is assumed in Tables 1 and 2 below that phase calibration is performed in the order of chain combinations obtained by successively selecting reception chains with reference to one transmission chain.

Table 1 below gives an example of phase calibration with regard to a forward path. For example, it is assumed in connection with the forward path that, between two multi-antenna groups, multi-antenna group #1 operates as a transmission multi-antenna group, and multi-antenna group #2 operates as a reception antenna group. It is also assumed that the antenna array included in the transmission multi-antenna group includes three transmission antennas, and the antenna array included in the reception multi-antenna group includes three reception antennas. The three transmission antennas correspond to forward transmission chains, respectively, and, in order to identify the transmission chain, each forward transmission chain is endowed with a transmission chain index CHAIN_TX #n. The three reception antennas correspond to forward reception chains, respectively, and, in order to identify the reception chain, each forward reception chain is endowed with a reception chain index CHAIN_RX #n.

TABLE 1

| Transmission chain index (multi-antenna group #1) | Reception chain index (multi-antenna group #2) | Measured phase | Calibrated phase |
|---|---|---|---|
| CHAIN_TX #0 | CHAIN_RX #0 | FL (DTX#0 + DRX#0) | FL (DTX#0 + DRX#0) |
| | CHAIN_RX #1 | FL (DTX#0 + DRX#1) | |
| | CHAIN_RX #2 | FL (DTX#0 + DRX#2) | |
| CHAIN_TX #1 | CHAIN_RX #0 | FL (DTX#1 + DRX#0) | FL (DTX#1 + DRX#0) |
| | CHAIN_RX #1 | FL (DTX#1 + DRX#1) | |
| | CHAIN_RX #2 | FL (DTX#1 + DRX#2) | |
| CHAIN_TX #2 | CHAIN_RX #0 | FL (DTX#2 + DRX#0) | FL (DTX#2 + DRX#0) |
| | CHAIN_RX #1 | FL (DTX#2 + DRX#1) | |
| | CHAIN_RX #2 | FL (DTX#2 + DRX#2) | |

As seen in Table 1 above, chain combinations are defined by combining respective transmission antennas, which are positioned on a forward transmission path in a front FR module that constitutes multi-antenna group #1, and respective reception antennas, which are positioned on a forward reception path in a front RF module that constitutes multi-antenna group #2.

According to Table 1 above, phase FL (DTX#0+DRX#0) has been measured with regard to a full path that corresponds to chain combination (CHAIN_TX #0, CHAIN_RX #0), and the phase FL has been set as a reference phase value. Then, phase values FL (DTX#0+DRX#1), FL (DTX#0+DRX#2), which have been measured with regard to combinations with the remaining forward reception chains with reference to forward transmission chain CHAIN_TX #0, can be calibrated by means of the reference phase value FL (DTX#0+DRX#0).

When phase calibration of chain combinations by means of CHAIN_TX #0 is completed, phase calibration of chain combinations formed by the next transmission chain index CHAIN_TX #1 is performed. Phase FL (DTX#1+DRX#0) has been measured with regard to a full path that corresponds to chain combination (CHAIN_TX #1, CHAIN_RX #0), and the Phase FL (DTX#1+DRX#0) has been set as a reference phase value. Then, phase values FL (DTX#1+DRX#1), FL (DTX#1+DRX#2), which have been measured with regard to combinations with the remaining reception chains with reference to forward transmission chain CHAIN_TX #1, can be calibrated by means of the reference phase value FL (DTX#1+DRX#0).

When phase calibration of chain combinations by means of CHAIN_TX #1 is completed, phase calibration of chain combinations formed by the next transmission chain index CHAIN_TX #2 is performed. Phase FL (DTX#2+DRX#0) has been measured with regard to a full path that corresponds to chain combination (CHAIN_TX #2, CHAIN_RX #0), and the Phase FL (DTX#2+DRX#0) has been set as a reference phase value. Then, phase values FL (DTX#2+DRX#1), FL (DTX#2+DRX#2), which have been measured with regard to combinations with the remaining reception chains with reference to forward transmission chain CHAIN_TX #2, can be calibrated by means of the reference phase value FL (DTX#2+DRX#0).

Table 2 below gives an example of phase calibration with regard to a reverse path. For example, it is assumed in connection with the reverse path that, between two multi-antenna groups, multi-antenna group #2 operates as a transmission multi-antenna group, and multi-antenna group #1 operates as a reception antenna group. It is also assumed that the antenna array included in the transmission multi-antenna group includes three transmission antennas, and the antenna array included in the reception multi-antenna group includes three reception antennas. The three transmission antennas correspond to reverse transmission chains, respectively, and, in order to identify the transmission chains, each reverse transmission chain is endowed with a transmission chain index CHAIN_TX #n. The three reception antennas correspond to reverse reception chains, respectively, and, in order to identify the reception chains, each reverse reception chain is endowed with a reception chain index CHAIN_RX #n.

TABLE 2

| Transmission chain index (multi-antenna group #2) | Reception chain index (multi-antenna group #1) | Measured phase | Calibrated phase |
|---|---|---|---|
| CHAIN_TX #0 | CHAIN_RX #0 | RL (DTX#0 + DRX#0) | RL (DTX#0 + DRX#0) |
| | CHAIN_RX #1 | RL (DTX#0 + DRX#1) | |
| | CHAIN_RX #2 | RL (DTX#0 + DRX#2) | |
| CHAIN_TX #1 | CHAIN_RX #0 | RL (DTX#1 + DRX#0) | RL (DTX#1 + DRX#0) |
| | CHAIN_RX #1 | RL (DTX#1 + DRX#1) | |
| | CHAIN_RX #2 | RL (DTX#1 + DRX#2) | |
| CHAIN_TX #2 | CHAIN_RX #0 | RL (DTX#2 + DRX#0) | RL (DTX#2 + DRX#0) |
| | CHAIN_RX #1 | RL (DTX#2 + DRX#1) | |
| | CHAIN_RX #2 | RL (DTX#2 + DRX#2) | |

As seen in Table 2 above, chain combinations are defined by combining respective transmission antennas, which are positioned on a reverse transmission path in a front FR module that constitutes multi-antenna group #2, and respective reception antennas, which are positioned on a reverse reception path in a front RF module that constitutes multi-antenna group #1.

According to Table 2 above, phase RL (DTX#0+DRX#0) has been measured with regard to a full path that corresponds to chain combination (CHAIN_TX #0, CHAIN_RX #0), and the phase RL (DTX#0+DRX#0) has been set as a reference phase value. Then, phase values RL (DTX#0+DRX#1), RL (DTX#0+DRX#2), which have been measured with regard to combinations with the remaining reverse reception chains with reference to reverse transmission chain CHAIN_TX #0, can be calibrated by means of the reference phase value RL (DTX#0+DRX#0).

When phase calibration of chain combinations by means of CHAIN_TX #0 is completed, phase calibration of chain combinations formed by the next transmission chain index CHAIN_TX #1 is performed. Phase RL (DTX#1+DRX#0) has been measured with regard to a full path that corresponds to chain combination (CHAIN_TX #1, CHAIN_RX #0), and the phase RL (DTX#1+DRX#0) has been set as a reference phase value. Then, phase values RL (DTX#1+DRX#1), RL (DTX#1+DRX#2), which have been measured with regard to combinations with the remaining reception chains with reference to transmission chain CHAIN_TX #1, can be calibrated by means of the reference phase value RL (DTX#1+DRX#0).

When phase calibration of chain combinations by means of CHAIN_TX #1 is completed, phase calibration of chain combinations formed by the next transmission chain index CHAIN_TX #2 is performed. Phase RL (DTX#2+DRX#0) has been measured with regard to a full path that corresponds to chain combination (CHAIN_TX #2, CHAIN_RX #0), and the phase RL (DTX#2+DRX#0) has been set as a reference phase value. Then, phase values RL (DTX#2+DRX#1), RL (DTX#2+DRX#2), which have been measured with regard to combinations with the remaining reception chains with reference to transmission chain CHAIN_TX #2, can be calibrated by means of the reference phase value RL (DTX#2+DRX#0).

It is assumed in Tables 3 and 4 below that phase calibration is performed in the order of chain combinations obtained by successively selecting transmission chains with reference to one reception chain.

Table 3 below gives an example of phase calibration with regard to a forward path. For example, it is assumed in connection with the forward path that, between two multi-antenna groups, multi-antenna group #1 operates as a transmission multi-antenna group, and multi-antenna group #2 operates as a reception antenna group. It is also assumed that the antenna array included in the transmission multi-antenna group includes three transmission antennas, and the antenna array included in the reception multi-antenna group includes three reception antennas. The three transmission antennas correspond to forward transmission chains, respectively, and, in order to identify the transmission chains, each forward transmission chain is endowed with a transmission chain index CHAIN_TX #n. The three reception antennas correspond to forward reception chains, respectively, and, in order to identify the reception chains, each forward reception chain is endowed with a reception chain index CHAIN_RX #n.

TABLE 3

| Reception chain index (multi-antenna group #2) | Transmission chain index (multi-antenna group #1) | Measured phase | Calibrated phase |
| --- | --- | --- | --- |
| CHAIN_RX #0 | CHAIN_TX #0 | FL (DRX#0 + DTX#0) | FL (DRX#0 + DTX#0) |
|  | CHAIN_TX #1 | FL (DRX#0 + DTX#1) |  |
|  | CHAIN_TX #2 | FL (DRX#0 + DTX#2) |  |
| CHAIN_RX #1 | CHAIN_TX #0 | FL (DRX#1 + DTX#0) | FL (DRX#1 + DTX#0) |
|  | CHAIN_TX #1 | FL (DRX#1 + DTX#1) |  |
|  | CHAIN_TX #2 | FL (DRX#1 + DTX#2) |  |
| CHAIN_RX #2 | CHAIN_TX #0 | FL (DRX#2 + DTX#0) | FL (DRX#2 + DTX#0) |
|  | CHAIN_TX #1 | FL (DRX#2 + DTX#1) |  |
|  | CHAIN_TX #2 | FL (DRX#2 + DTX#2) |  |

As seen in Table 3, that chain combinations are defined by combining respective reception antennas, which are positioned on a forward reception path in a front FR module that constitutes multi-antenna group #2, and respective transmission antennas, which are positioned on a forward transmission path in a front RF module that constitutes multi-antenna group #1.

According to Table 3 above, phase FL (DRX#0+DTX#0) has been measured with regard to a full path that corresponds to chain combination (CHAIN_RX #0, CHAIN_TX #0), and the phase FL (DRX#0+DTX#0) has been set as a reference phase value. Then, phase values FL (DRX#0+DTX#1), FL (DRX#0+DTX#2), which have been measured with regard to combinations with the remaining transmission chains with reference to reception chain CHAIN_RX #0, can be calibrated by means of the reference phase value FL (DRX#0+DTX#0).

When phase calibration of chain combinations by means of CHAIN_RX #0 is completed, phase calibration of chain combinations formed by the next reception chain index CHAIN_RX #1 is performed. Phase FL (DRX#1+DTX#0) has been measured with regard to a full path that corresponds to chain combination (CHAIN_RX #1, CHAIN_TX #0), and the (DRX#1+DTX#0) has been set as a reference phase value. Then, phase values FL (DRX#1+DTX#1), FL (DRX#1+DTX#2), which have been measured with regard to combinations with the remaining transmission chains with reference to reception chain CHAIN_RX #1, can be calibrated by means of the reference phase value FL (DRX#1+DTX#0).

When phase calibration of chain combinations by means of CHAIN_RX #1 is completed, phase calibration of chain combinations formed by the next reception chain index CHAIN_RX #2 is performed. That is, phase FL (DRX#2+DTX#0) has been measured with regard to a full path that corresponds to chain combination (CHAIN_RX #2, CHAIN_TX #0), and the phase FL (DRX#2+DTX#0) has been set as a reference phase value. Then, phase values FL (DRX#2+DTX#1), FL (DRX#2+DTX#2), which have been measured with regard to combinations with the remaining transmission chains with reference to reception chain CHAIN_RX #2, can be calibrated by means of the reference phase value FL (DRX#2+DTX#0).

Table 4 below gives an example of phase calibration with regard to a reverse path. For example, it is assumed in connection with the reverse path that, between two multi-antenna groups, multi-antenna group #1 operates as a reception multi-antenna group, and multi-antenna group #2 operates as a transmission antenna group. It is also assumed that the antenna array included in the transmission multi-antenna group includes three transmission antennas, and the antenna array included in the reception multi-antenna group includes three reception antennas. The three transmission antennas correspond to reverse transmission chains, respectively, and, in order to identify the transmission chains, each reverse transmission chain is endowed with a transmission chain index CHAIN_TX #n. The three reception antennas correspond to reverse reception chains, respectively, and, in order to identify the reception chains, each reverse reception chain is endowed with a reception chain index CHAIN_RX #n.

TABLE 4

| Reception chain index (multi-antenna group #1) | Transmission chain index (multi-antenna group #2) | Measured phase | Calibrated phase |
| --- | --- | --- | --- |
| CHAIN_RX #0 | CHAIN_TX #0 | RL (DRX#0 + DTX#0) | RL (DRX#0 + DTX#0) |
|  | CHAIN_TX #1 | RL (DRX#0 + DTX#1) |  |
|  | CHAIN_TX #2 | RL (DRX#0 + DTX#2) |  |
| CHAIN_RX #1 | CHAIN_TX #0 | RL (DRX#1 + DTX#0) | RL (DRX#1 + DTX#0) |

TABLE 4-continued

| Reception chain index (multi-antenna group #1) | Transmission chain index (multi-antenna group #2) | Measured phase | Calibrated phase |
|---|---|---|---|
| | CHAIN_TX #1 | RL (DRX#1 + DTX#1) | |
| | CHAIN_TX #2 | RL (DRX#1 + DTX#2) | |
| CHAIN_RX #2 | CHAIN_TX #0 | RL (DRX#2 + DTX#0) | RL (DRX#2 + DTX#0) |
| | CHAIN_TX #1 | RL (DRX#2 + DTX#1) | |
| | CHAIN_TX #2 | RL (DRX#2 + DTX#2) | |

As seen in Table 4 above, chain combinations are defined by combining respective transmission antennas, which are positioned on a reverse transmission path in a front FR module that constitutes multi-antenna group #2, and respective reception antennas, which are positioned on a reverse reception path in a front RF module that constitutes multi-antenna group #1.

According to Table 4 above, phase RL (DRX#0+DTX#0) has been measured with regard to a full path that corresponds to chain combination (CHAIN_RX #0, CHAIN_TX #0), and the phase RL (DRX#0+DTX#0) has been set as a reference phase value. Then, phase values RL (DRX#0+DTX#1), RL (DTX#0+DTX#2), which have been measured with regard to combinations with the remaining reverse transmission chains with reference to reverse reception chain CHAIN_RX #0, can be calibrated by means of the reference phase value RL (DTX#0+DRX#0).

When phase calibration of chain combinations by means of CHAIN_RX #0 is completed, phase calibration of chain combinations formed by the next reception chain index CHAIN_RX #1 is performed. Phase RL (DRX#1+DTX#0) has been measured with regard to a full path that corresponds to chain combination (CHAIN_RX #1, CHAIN_TX #0), and the phase RL (DRX#1+DTX#0) has been set as a reference phase value. Then, phase values RL (DRX#1+DTX#1), RL (DRX#1+DTX#2), which have been measured with regard to combinations with the remaining transmission chains with reference to reception chain CHAIN_RX #1, can be calibrated by means of the reference phase value FL (DRX#1+DTX#0).

When phase calibration of chain combinations by means of CHAIN_RX #1 is completed, phase calibration of chain combinations formed by the next reception chain index CHAIN_RX #2 is performed. Phase RL (DRX#2+DTX#0) has been measured with regard to a full path that corresponds to chain combination (CHAIN_RX #2, CHAIN_TX #0), and the phase RL (DRX#2+DTX#0) has been set as a reference phase value. Then, phase values RL (DRX#2+DTX#1), RL (DRX#2+DTX#2), which have been measured with regard to combinations with the remaining transmission chains with reference to reception chain CHAIN_RX #2, can be calibrated by means of the reference phase value RL (DRX#2+DTX#0).

Figure 12:
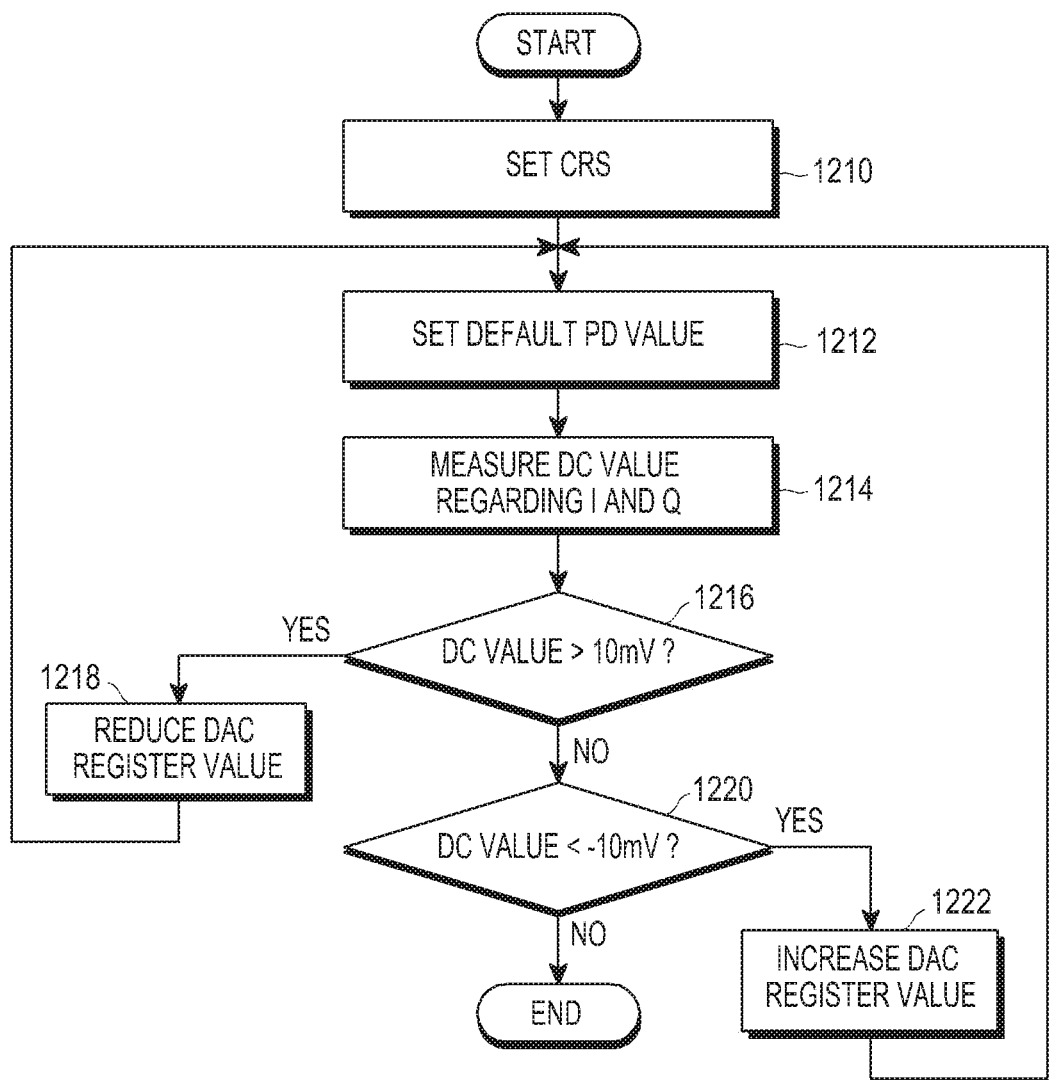
FIG. 12 is a diagram illustrating a control flow for performing calibration with regard to a digital area in connection with a wireless communication terminal according to an embodiment of the present disclosure.

FIG. 12 illustrates a control flow for performing calibration with regard to a digital area in connection with a wireless communication terminal according to various embodiments.

Referring to FIG. 12, the wireless communication terminal sets a calibration set register (CSR) in operation 1210. The wireless communication terminal sets a default power down (PD) value in operation 1212. The wireless communication terminal measures DC values related to an I channel and a Q channel on the basis of the CSR and the default power down value that have been set (operation 1214).

The wireless communication terminal determines whether the measured DC value is larger than 10 mV in operation 1216. When the measured DC value is larger than 10 mV, the wireless communication terminal reduces the DAC register value on the basis of the previously set default PD value in operation 1218. The wireless communication terminal measures the DV value related to the I and Q channels on the basis of the reduced DAC register value in operation 1214.

The wireless communication terminal determines whether the measured DC value is smaller than −10 mV in operation 1220. When the measured DC value is smaller than −10 mV, the wireless communication terminal increases the DAC register value on the basis of the previously set default PD value in operation 1222. The wireless communication terminal measures the DV value related to the I and Q channels on the basis of the increased DAC register value in operation 1214.

When the measured DC value is neither larger than 10 mV nor smaller than −10 mV, the wireless communication terminal completes the operation of calibrating the DC in the reception path.

While the present disclosure has been shown and described with reference to various embodiments thereof, it will be understood by those skilled in the art that various in form and details may be made therein without departing from the spirit and scope of the present disclosure as defined by the appended claims and their equivalents.

What is claimed is:

1. A wireless communication terminal device having a multi-antenna, the wireless communication terminal device comprising:
    a first radio frequency (RF) circuit comprising a first antenna array;
    a second RF circuit comprising a second antenna array;
    a third RF circuit connected to each of the first RF circuit and the second RF circuit;
    a digital modem configured to:
        output a first signal to the third RF circuit,
        receive a second signal from the third RF circuit in response to the first signal, and
        calibrate a phase value for each of first chain combinations formed by the first antenna array and the second antenna array based on the first signal and the second signal; and
    a member configured to form a transmission path and a reception path between the first RF circuit and the second RF circuit,
    wherein the transmission path is configured by the third RF circuit and the first RF circuit to transmit the first signal, and
    wherein the reception path is configured by the second RF circuit and the third RF circuit to receive the first signal and output the second signal to the digital modem.

2. The wireless communication terminal device of claim 1, wherein at least one of the first antenna array and the second antenna array is positioned at a corner of the wireless communication terminal device.

3. The wireless communication terminal device of claim 1, further comprising:
    a first cable that connects the first RF circuit to the third RF circuit; and
    a second cable that connects the second RF circuit to the third RF circuit, wherein a length of the first cable is different from a length of the second cable.

4. The wireless communication terminal device of claim 1,
wherein the member comprises a waveguide, and
wherein fasteners provided on both sides of the waveguide are fastened to the first antenna array and the second antenna array.

5. The wireless communication terminal device of claim 1,
wherein the member comprises a metal housing, and
wherein the metal housing is attached so as to surround four side surfaces of the wireless communication terminal device.

6. The wireless communication terminal device of claim 1, wherein the first RF circuit is arranged on a corner of the wireless communication terminal device diagonally opposite from a corner where the second RF circuit is arranged.

7. The wireless communication terminal device of claim 1, wherein the first RF circuit is arranged on a corner of the wireless communication terminal device adjacent to a corner where the second RF circuit is arranged.

8. The wireless communication terminal device of claim 1, wherein the digital modem is further configured to:
select a first antenna in the first antenna array and a second antenna in the second antenna array,
measure a phase value for a chain combination formed based on the selected first antenna and the selected second antenna,
set the measured phase value as a reference phase value, and
calibrate a phase value for each of second chain combinations based on the reference phase value, the second chain combinations being formed based on the selected first antenna and remaining antennas in the second antenna array.

9. The wireless communication terminal device of claim 1,
wherein the digital modem is further configured to:
output a third signal to the third RF circuit,
receive a fourth signal from the third RF circuit, in response to the third signal, and
calibrate a phase value for each of second chain combinations formed by the first antenna array and the second antenna array, based on the third signal and the fourth signal,
wherein a transmission path to transmit the third signal is configured by the third RF circuit and the second RF circuit, and
wherein a reception path to receive the third signal and output the fourth signal to the digital modem is configured by the first RF circuit and the third RF circuit.

10. The wireless communication terminal device of claim 9, wherein the digital modem is further configured to:
select a first antenna in the second antenna array and a second antenna in the first antenna array,
measure a phase value for a chain combination formed based on the selected first antenna and the selected second antenna,
set the measured phase value as a reference phase value, and
calibrate a phase value for each of second chain combinations based on the reference phase value, the second chain combinations being formed based on the selected first antenna and remaining antennas in the first antenna array.

11. A method for calibrating a phase in a wireless communication terminal device comprising a first radio frequency (RF) circuit including a first antenna array, a second RF circuit including a second antenna array, a third RF circuit connected to each of the first RF circuit and the second RF circuit, and a digital modem, the method comprising:
outputting, by the digital modem, a first signal to the third RF circuit;
receiving, by the digital modem, a second signal from the third RF circuit in response to the first signal; and
calibrating, by the digital modem, a phase value for each of first chain combinations formed by the first antenna array and the second antenna array based on the first signal and the second signal,
wherein a transmission path and a reception path between the first RF circuit and the second RF circuit are formed by a member in the wireless communication terminal device,
wherein the transmission path is configured by the third RF circuit and the first RF circuit to transmit the first signal, and
wherein the reception path is configured by the second RF circuit and the third RF circuit to receive the first signal and output the second signal to the digital modem.

12. The method of claim 11, wherein the calibrating of the phase value for each of the first chain combinations comprises:
selecting, by the digital modem, a first antenna in the first antenna array and a second antenna in the second antenna array;
measuring, by the digital modem, a phase value for a chain combination formed based on the selected first antenna and the selected second antenna;
setting, by the digital modem, the measured phase value as a reference phase value; and
calibrating, by the digital modem, a phase value for each of second chain combinations based on the reference phase value, the second chain combinations being formed based on the selected first antenna and remaining antennas in the second antenna array.

13. The method of claim 11, further comprising:
outputting, by the digital modem, a third signal to the third RF circuit,
receiving, by the digital modem, a fourth signal from the third RF circuit, in response to the third signal, and
calibrating, by the digital modem, a phase value for each of second chain combinations formed by the first antenna array and the second antenna array, based on the third signal and the fourth signal,
wherein a transmission path to transmit the third signal is configured by the third RF circuit and the second RF circuit, and
wherein a reception path to receive the third signal and output the fourth signal to the digital modem is configured by the first RF circuit and the third RF circuit.

14. The method of claim 13, wherein, the calibrating of the phase value for each of the second chain combinations comprises:
selecting, by the digital modem, a first antenna in the second antenna array and a second antenna in the first antenna array;
measuring, by the digital modem, a phase value for a chain combination formed based on the selected first antenna and the selected second antenna;
setting, by the digital modem, the measured phase value as a reference phase value; and calibrating, by the digital modem, a phase value for each of second chain combinations based on the reference phase value, the second chain combinations being formed based on the selected first antenna and remaining antennas in the first antenna array.

* * * * *